(12) United States Patent
Sullivan

(10) Patent No.: US 7,248,466 B2
(45) Date of Patent: Jul. 24, 2007

(54) INTERCHANGEABLE COMPUTER USER INTERFACE WITH FUNCTION ENABLING AND SWITCHING OF COMPUTER DISPLAY

(75) Inventor: Terrance Patrick Sullivan, Madison, WI (US)

(73) Assignee: The General Electric Co., Schenectady, NY (US)

( * ) Notice: Subject to any disclaimer, the term of this patent is extended or adjusted under 35 U.S.C. 154(b) by 262 days.

(21) Appl. No.: 11/050,922

(22) Filed: Feb. 4, 2005

(65) Prior Publication Data

US 2006/0176656 A1 Aug. 10, 2006

(51) Int. Cl.
*G06F 1/16* (2006.01)
(52) U.S. Cl. .................... 361/683; 312/223.3
(58) Field of Classification Search ............ 361/680, 361/683; 312/223.3
See application file for complete search history.

(56) References Cited

U.S. PATENT DOCUMENTS

| 5,739,810 | A | * | 4/1998 | Merkel | 361/680 |
| 6,121,958 | A | * | 9/2000 | Clark et al. | 361/680 |
| 6,560,093 | B1 | * | 5/2003 | McLeod et al. | 312/223.2 |
| 6,700,773 | B1 | * | 3/2004 | Adriaansen et al. | 361/680 |
| 6,865,075 | B2 | * | 3/2005 | Oakley | 361/683 |

* cited by examiner

*Primary Examiner*—Lisa Lea-Edmonds
(74) *Attorney, Agent, or Firm*—Andrus, Sceales, Starke & Sawall, LLP

(57) ABSTRACT

A computer workstation has interchangeable user interfaces, thereby to allow a single workstation to carry out a plurality of work functions. When the user interface is changed, the workstation visual display is correspondingly changed to show a format and information associated with the operative user interface. Functions available from the workstation CPU may also be changed.

14 Claims, 3 Drawing Sheets

INTERCHANGEABLE COMPUTER USER INTERFACE WITH FUNCTION ENABLING AND SWITCHING OF COMPUTER DISPLAY

BACKGROUND AND SUMMARY

The present invention relates to computer workstations of the type having a user interface or input device, such as a keyboard, and a visual display such as a CRT or LCD screen. More particularly, the invention relates to such a workstation having an interface that is interchangeable so that multiple, unique or specialized keyboards may be provided to a user. When the keyboard is changed, the format and information on the visual display may be correspondingly changed. The functions available from the central processing unit (CPU) associated with the workstation can also be changed. While not so limited, the present invention finds use in medical applications.

Working environments are becoming increasingly information intensive. At present, separate workstations are often required for different forms of information. In a medical example, monitoring the physiological functions or recording vital signs of a patient employs one workstation dedicated to that activity while to view imaging of the patient requires a separate, dedicated workstation. Often there is only a limited amount of space for the various workstations in a clinician's work area making it difficult for the clinician to carry out his/her work. For workstations used in direct patient care, the need for multiple workstations makes it difficult to bring the workstations into proximity to the patient. Some of the workstations may be needed for only a short time, as for example when viewing patient images prior to carrying out a medical procedure, but the workstation will nonetheless be present in the operating environment all of the time. The need for many different workstations also adds to the cost of carrying out work functions.

It is, therefore, the object of the present invention to provide a computer workstation having interchangeable user interfaces, thereby to allow a single workstation to carry out a plurality of work functions or applications. When the user interface is changed, the workstation visual display can be automatically correspondingly changed to show a format and information associated with the user interface that is in use. The functions available from the workstation CPU may also be changed. The result is a saving of space and cost since a single workstation can now serve multiple functions.

The present invention will be understood by reference to the drawings and following detailed description.

DETAILED DESCRIPTION OF THE PREFERRED EMBODIMENTS

Figure 1:
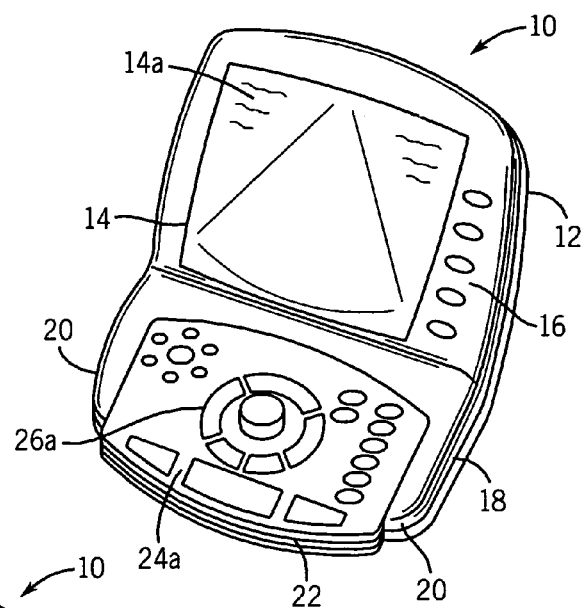
FIG. 1 illustrates the general construction of an apparatus of the present invention having an interchangeable user interface and an associated display.
Figure 2:
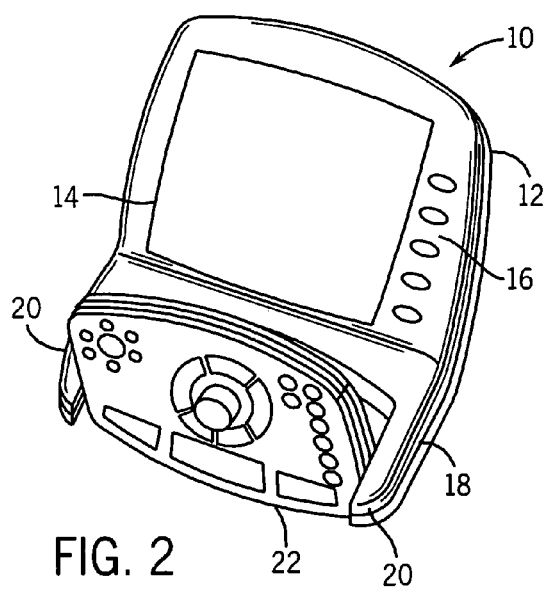
FIG. 2 shows a manner in which the user interface may be changed.
Figure 3:
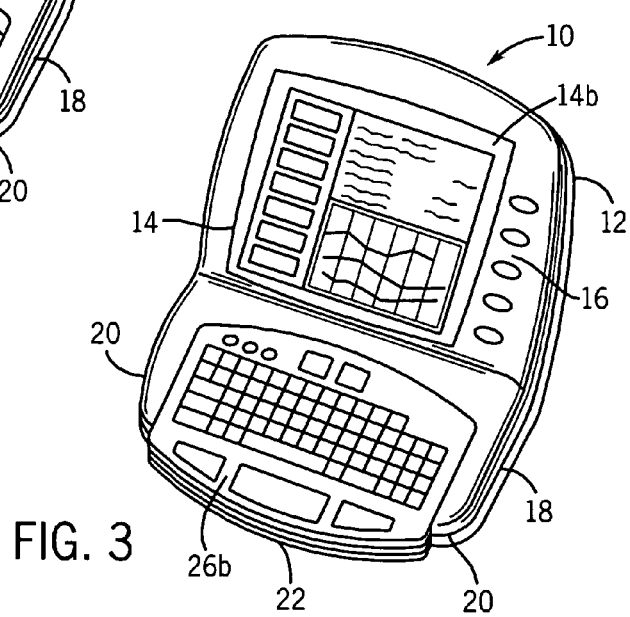
FIG. 3 shows the apparatus of the present invention with another user interface.

FIGS. 1, 2, and 3 show an embodiment of computer workstation apparatus 10 incorporating the present invention so as to have an interchangeable user interface. While apparatus 10 is shown as a unitary construction in these figures, it will be appreciated that the components of the apparatus may be separate, if desired. Computer workstation apparatus 10 includes housing 12 containing a central processing unit or CPU (not shown) for the workstation. Housing 12 also contains a visual display 14 coupled to the CPU for displaying information to the user of the computer workstation. Appropriate controls 16 for controlling the work station and/or display, such as an ON-OFF switch for the workstation, etc. may be provided adjacent display 14.

In the embodiment of the invention shown in FIGS. 1-3, a base portion 18 of housing 12 is formed to render the user interface interchangeable. For this purpose, base portion 18 may have a pair of spaced arms 20. A user interface means 22 is rotatably mounted on arms 20.

FIG. 1 shows an operative condition of computer workstation 10 in which the computer workstation is used in connection with ultrasonic imaging of a patient. Such imaging data may be provided to the workstation via a network connection, a suitable internal memory storage device, or an external storage medium that is placed in a suitable reader (not shown) in the computer workstation. Computer user interface means 22 includes a keyboard 24*a* having keys 26*a* operable by the user and suitable for initiating, viewing, and manipulating ultrasound images. Display 14 displays ultrasound images 14*a* and the functions available from the CPU of workstation 10 are those suitable for ultrasound imaging.

It is now desired to put workstation 10 to a different use. In accordance with the present invention and as shown generally in FIG. 2, and in detail in FIG. 4, user interface means 22 is rotated in spaced arms 20 so that a keyboard 26*b* suitable to the new operating mode of workstation 10 can be placed in the position so as to be operable by a clinician or other user of the workstation. As user interface means 22 is rotated from the position shown in FIG. 1 to the position shown in FIG. 3, the CPU of the workstation is operated to cause the format and information of display 14 to change to a form (14*b*) suitable for the new operating mode of the workstation. As exemplarily shown in FIG. 3, the new operating mode of workstation 10 may be that of carrying out electronic medical recordkeeping for a patient that employs a keyboard 26*b* having keys suitable for entering alpha-numeric data. Display 14*b* contains such information in textual and/or graphic form.

Base 18 is positioned sufficiently above a supporting work surface to allow the rotating action of user interface means 22 to be carried out.

Figure 4:
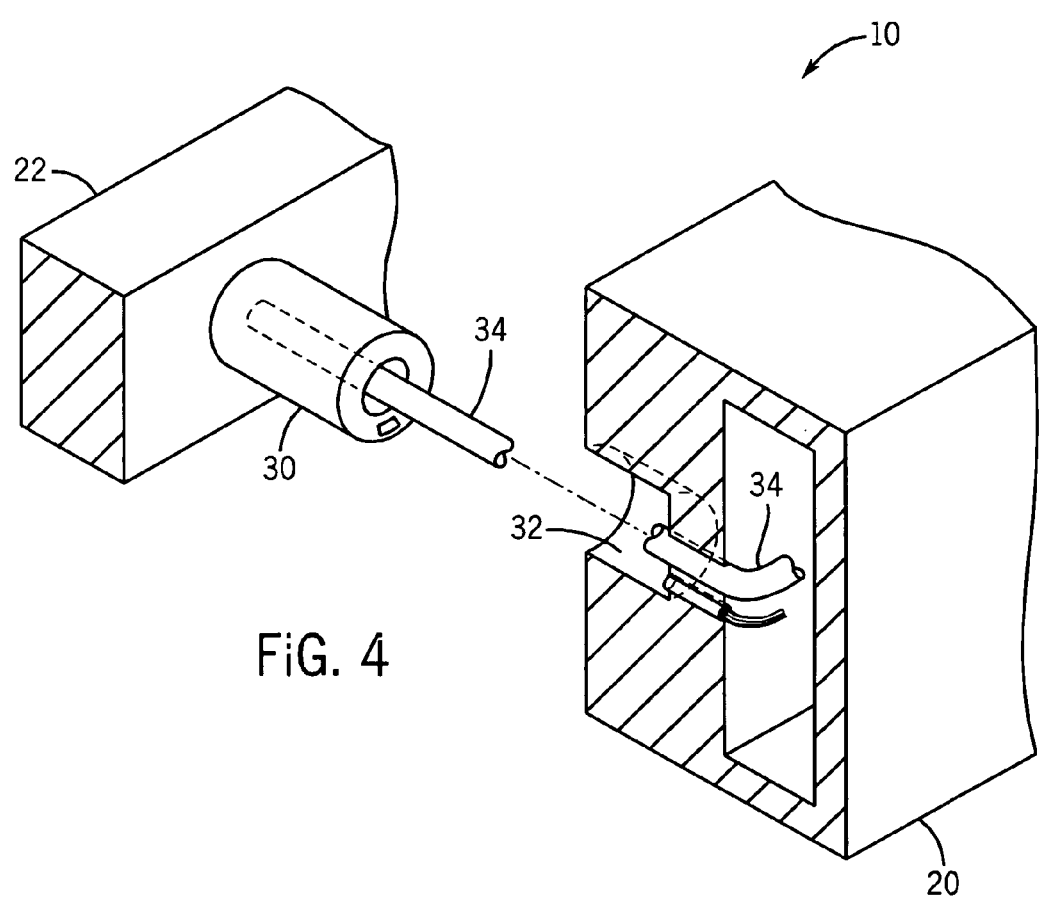
FIG. 4 is a detailed view of a portion of the apparatus of FIGS. 1 through 3.

As shown in FIG. 4, user interface means 22 may contain a hollow projection 30 on each end rotatably mounted in recesses 32 in arms 20. Hollow projection 30 contains cable 34 extending from user interface means 22 to the CPU of workstation 10.

A suitable sensor 36*a*, 36*b* may be provided in one of the projections 30 and one of the arms 20 to sense the orientation of the user interface means 22 and operate workstation 10 to provide a display 14 corresponding to the operative keyboard 24*a*, 24*b* and provide the appropriate functions for the CPU of the workstation. Sensor 36*a*, 36*b* may be of a magnetic, optical, mechanical, or other appropriate type. Or, the keys of the keyboard 24a, 24b that is positioned for use by the clinician may be operated to change the display and functions of the CPU.

Figure 5:
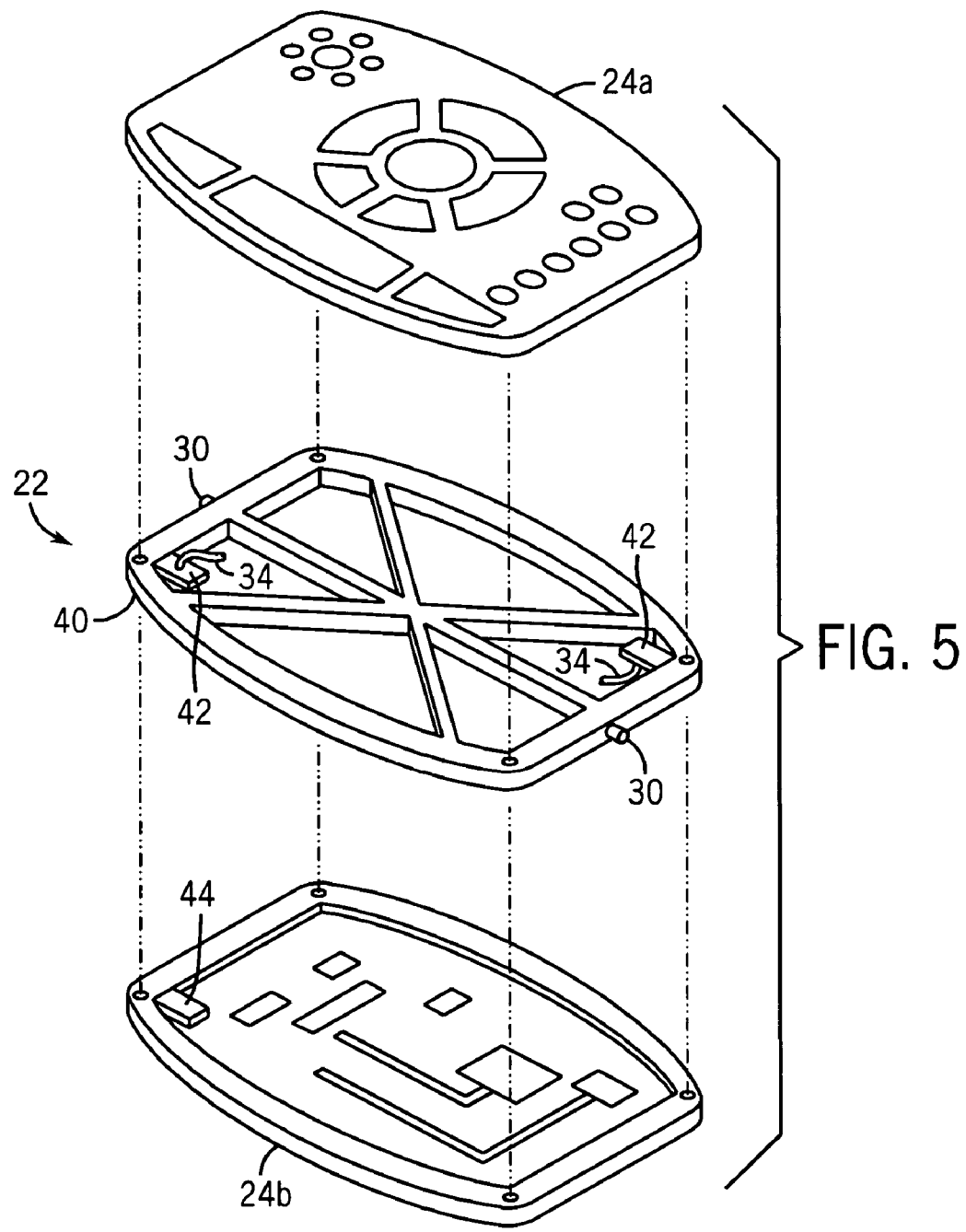
FIG. 5 is an exploded view showing a construction for the apparatus of the present invention.

FIG. 5 shows a construction for user interface means 22. User interface means 22 has a central frame 40 containing projections 30 for rotating the frame. One keyboard 24a is mounted on one side of frame 40 and the other keyboard 24b is mounted on the other side. Connectors 42 are provided on frame 40 to mate with corresponding connectors 44 on the keyboards. Connectors 42 are connected to cable 34. Keyboards 24a, 24b may be removably affixed to frame 40 so that keyboards of the type needed for the desired modes of operation of workstation 10 may be secured to the frame. This provides increased flexibility to the use and operation of workstation 10.

While imaging and patient recordkeeping functions have been described above, other typical medical functions for the workstation includes fluids management, anesthesia control, patient monitoring, and others.

Also, while a rotating motion has been shown in connection with interchanging the operative keyboard, it will be appreciated that some other type of motion may be used, if desired. For example, arms 20 may be provided with grooves and user interface means 22 slid out, oriented to the desired position and slid back in in order to change the operative keyboard.

Various other alternatives and embodiments are contemplated as being within the scope of the following claims particularly pointing out and distinctly claiming the subject matter regarded as the invention.

What is claimed is:

1. An improved computer workstation comprising:
   a central processing unit;
   a display coupled to said central processing unit for displaying visually perceptible information to a user of the workstation;
   a user interface means coupled to said central processing unit, said user interface means comprising:
   a first set of user operated means operable by a user for operating the workstation in a first mode;
   a second set of user operated means operable by a user for operating the workstation in a second mode;
   means for interchangeably positioning said user interface means in a first position in which said first set of user operated means is positioned to be operable by the user and in a second position in which said second set of user operable means is positioned to be operated by the user; and
   a sensor for sensing a current position of the user interface means;
   control means for allowing said display to show information commensurate with the operable one of said first and second sets of user operated means;
   wherein said control means is further defined as responsive to the sensed position of said user interface means in a selected one of said first and second positions for causing said display to show information commensurate with the operating mode of the workstation corresponding to the selected position of said user interface means.

2. The improved computer workstation of claim 1 further including means responsive to the positioning of said user interface means in a selected one of said first and second positions for causing said central processing unit to provide functions commensurate with the operating mode of the selected workstation corresponding to the selected position of said user interface means.

3. The improved computer workstation of claim 1 further including means responsive to the positioning of said user interface means in a selected one of said first and second positions for causing said central processing unit to provide functions commensurate with the operating mode of the selected workstation corresponding to the selected position of said user interface means.

4. The improved computer workstation of claim 1 wherein said user interface means is rotatably mounted in said computer workstation.

5. The improved computer workstation of claim 1 wherein said first set of user operated means is mounted on a first side of said user interface means and wherein said second set of user operated means is mounted on a second side of said user interface means.

6. The improved computer workstation of claim 1 wherein said first set of user operated means is mounted on a first side of said user interface means and wherein said second set of user operated means is mounted on a second side of said user interface means.

7. The improved computer workstation of claim 5 wherein said user interface means comprises a central frame with said first set of user operated means on one side and said second set of user operated means on the other side.

8. The improved computer workstation of claim 6 wherein said user interface means comprises a central frame with said first set of user operated means on one side and said second set of user operated means on the other side.

9. An improved computer workstation comprising:
   a central processing unit;
   a display coupled to said central processing unit for displaying visually perceptible information to a user of the workstation;
   a user interface means coupled to said central processing unit, said user interface means comprising:
   a first set of user operated means operable by a user for operating the workstation in a first mode;
   a second set of user operated means operable by a user for operating the workstation in a second mode;
   means for interchangeably positioning said user interface means in a first position in which said first set of user operated means is positioned to be operable by the user and in a second position in which said second set of user operable means is positioned to be operated by the user; and
   control means for allowing said display to show information commensurate with the operable one of said first and second sets of user operated means;
   wherein at least one of said sets of user operated means is removably mounted on said user interface means.

10. An improved computer workstation comprising:
    a central processing unit;
    a display coupled to said central processing unit for displaying visually perceptible information to a user of the workstation;
    a user interface means coupled to said central processing unit, said user interface means comprising:
    a first set of user operated means operable by a user for operating the workstation in a first mode;
    a second set of user operated means operable by a user for operating the workstation in a second mode;
    means for interchangeably positioning said user interface means in a first position in which said first set of user operated means is positioned to be operable by the user and in a second position in which said second set of user operable means is positioned to be operated by the user; and control means for allowing said display to show information commensurate with the operable one of said first and second sets of user operated means;

wherein said first set of user operated means is mounted on a first side of said user interface means and wherein said second set of user operated means is mounted on a second side of said user interface means;

wherein said user interface means comprises a central frame with said first set of user operated means on one side and said second set of user operated means on the other side;

wherein at least one of said sets of user operated means are removably mounted on said frame.

11. An improved computer workstation comprising:

a central processing unit;

a display coupled to said central processing unit for displaying visually perceptible information to a user of the workstation;

a user interface means coupled to said central processing unit, said user interface means comprising:

a first set of user operated means operable by a user for operating the workstation in a first mode;

a second set of user operated means operable by a user for operating the workstation in a second mode;

means for interchangeably positioning said user interface means in a first position in which said first set of user operated means is positioned to be operable by the user and in a second position in which said second set of user operable means is positioned to be operated by the user; and control means for allowing said display to show information commensurate with the operable one of said first and second sets of user operated means;

wherein said first set of user operated means is mounted on a first side of said user interface means and wherein said second set of user operated means is mounted on a second side of said user interface means;

wherein said user interface means comprises a central frame with said first set of user operated means on one side and said second set of user operated means on the other side;

wherein at least one of said sets of user operated means are removably mounted on said frame.

12. The improved computer workstation apparatus of claim 1 wherein said computer workstation is formed of unitary construction.

13. The improved computer workstation of claim 1 further defined as a medical computer workstation.

14. An improved medical computer workstation comprising:

a central processing unit;

a display coupled to said central processing unit to show visually perceptible information to a user of the workstation;

a user interface means coupled to said central processing unit comprising:

a first set of user operated means mounted on a first side of said user interface means and operable by a user for operating the workstation in a first mode;

a second set of user operated means mounted on a second side of said user interface means and operable by a user for operating the workstation in a second mode;

means for interchangeably positioning said user interface means in a first position in which said first side is positioned to permit said first user operated means to be operable by the user and for positioning said user interface means in a second position in which said second side is positioned to permit said second set of user operated means to be operated by the user; and means for sensing a current position of said user interface means;

means responsive to the sensed position of said user interface means for causing said display to show information commensurate with the operating mode of the workstation corresponding to the position of said user interface means.

* * * * *